(12) United States Patent
Park

(10) Patent No.: US 9,335,451 B2
(45) Date of Patent: May 10, 2016

(54) ARRANGEMENTS OF DECORATIVE ELEMENTS, LIGHTING FIXTURES, AND METHODS FOR PROVIDING ILLUMINATION

(71) Applicant: Swarovski Lighting, Ltd., Plattsburg, NY (US)

(72) Inventor: Saewoo Park, Plattsburgh, NY (US)

(73) Assignee: Swarovski Lighting, Ltd., Plattsburgh, NY (US)

( * ) Notice: Subject to any disclaimer, the term of this patent is extended or adjusted under 35 U.S.C. 154(b) by 116 days.

(21) Appl. No.: 13/834,271

(22) Filed: Mar. 15, 2013

(65) Prior Publication Data

US 2014/0268743 A1    Sep. 18, 2014

(51) Int. Cl.

| | |
|---|---|
| *F21S 8/06* | (2006.01) |
| *F21V 5/06* | (2006.01) |
| *G02B 5/08* | (2006.01) |
| *F21V 7/00* | (2006.01) |
| *F21V 13/04* | (2006.01) |

(52) U.S. Cl.
CPC . *G02B 5/08* (2013.01); *F21S 8/063* (2013.01); *F21S 8/065* (2013.01); *F21V 5/06* (2013.01); *F21V 7/00* (2013.01); *F21V 13/04* (2013.01)

(58) Field of Classification Search
CPC .............. F21V 5/06; F21S 8/065; F21S 13/06
USPC ................................................. 362/404–409
See application file for complete search history.

(56) References Cited

U.S. PATENT DOCUMENTS

| | | | |
|---|---|---|---|
| 3,946,353 A * | 3/1976 | Gallagher | 338/318 |
| D305,695 S * | 1/1990 | Segill | D26/86 |
| 5,144,541 A * | 9/1992 | Schonbek | 362/405 |
| 5,205,644 A | 4/1993 | Bayer et al. | |
| 5,222,805 A * | 6/1993 | Schonbek et al. | 362/405 |
| 5,567,046 A | 10/1996 | Lucas | |
| D403,101 S | 12/1998 | Bayer et al. | |
| 5,873,652 A | 2/1999 | Bayer et al. | |
| 5,906,430 A * | 5/1999 | Bayer | 362/404 |
| D517,726 S | 3/2006 | Schuyler et al. | |
| D522,168 S | 5/2006 | Schuyler | |
| D522,169 S | 5/2006 | Bayer | |

(Continued)

FOREIGN PATENT DOCUMENTS

GB        191016248 A *   3/1911

OTHER PUBLICATIONS

Morning Mist and Willow Tree, photograph, available online on Mar. 13, 2013, at http://web.archive.org/ web/20100210053810/http://www.picfor.me/en/viewimg/190445, 3-pages, Feb. 10, 2010.

(Continued)

*Primary Examiner* — Mariceli Santiago
(74) *Attorney, Agent, or Firm* — Heslin Rothenberg Farley & Mesiti P.C.

(57) ABSTRACT

An arrangement of decorative elements includes a frame, a plurality of strands of ornaments supported from the frame, a plurality of slats supported from the frame, and wherein the plurality of slats are interspersed with the plurality of strands of ornaments to define a row of strands of ornaments and slats. The frame may include an inner support for supporting the plurality of strands of ornaments and slats, and an outer support that extends around a peripheral edge of the inner support.

32 Claims, 11 Drawing Sheets

(56) References Cited

U.S. PATENT DOCUMENTS

| | | |
|---|---|---|
| D522,683 S | 6/2006 | Bayer et al. |
| D522,684 S | 6/2006 | Schuyler et al. |
| D522,685 S | 6/2006 | Bayer |
| D523,169 S | 6/2006 | Schuyler et al. |
| D523,578 S | 6/2006 | Schuyler et al. |
| D523,579 S | 6/2006 | Schuyler et al. |
| D523,988 S | 6/2006 | Schuyler et al. |
| D524,476 S | 7/2006 | Schuyler et al. |
| 7,101,065 B2 | 9/2006 | Bayer |
| D532,144 S | 11/2006 | Bayer et al. |
| D536,471 S | 2/2007 | Matons |
| 7,225,851 B2 | 6/2007 | Schonbek et al. |
| 7,261,444 B2 | 8/2007 | Schonbek et al. |
| 7,267,463 B2 | 9/2007 | Bayer et al. |
| D554,285 S | 10/2007 | Schuyler |
| D558,390 S | 12/2007 | Myers, Jr. et al. |
| D560,019 S | 1/2008 | Myers, Jr. et al. |
| D560,020 S | 1/2008 | Ly |
| D560,027 S | 1/2008 | Bayer |
| D560,306 S | 1/2008 | Ly |
| 7,347,594 B2 | 3/2008 | Bayer et al. |
| D577,145 S | 9/2008 | Schonbek et al. |
| D578,701 S | 10/2008 | Schuyler et al. |
| D580,089 S | 11/2008 | Ly et al. |
| D581,088 S | 11/2008 | Yando |
| D587,398 S | 2/2009 | Salatto-Rose |
| D587,837 S | 3/2009 | Schonbek et al. |
| D588,295 S | 3/2009 | Schonbek et al. |
| 7,758,216 B2 * | 7/2010 | Small ............ F21V 1/04 362/311.13 |
| D622,435 S | 8/2010 | Recore et al. |
| D624,235 S | 9/2010 | Forgette et al. |
| D624,236 S | 9/2010 | Recore et al. |
| D626,683 S | 11/2010 | Rabideau |
| D626,684 S | 11/2010 | Schuyler et al. |
| 7,854,532 B2 | 12/2010 | Myers, Jr. et al. |
| D634,472 S | 3/2011 | Forgette et al. |
| D636,519 S | 4/2011 | Rabideau et al. |
| D637,755 S | 5/2011 | Rabideau et al. |
| 8,128,259 B2 | 3/2012 | Myers et al. |
| D681,266 S | 4/2013 | Yando |
| 2006/0157207 A1 * | 7/2006 | Schonbek et al. ............ 160/332 |

OTHER PUBLICATIONS

Saewoo Park, Design U.S. Appl. No. 29/449,521, filed Mar. 15, 2013.
Saewoo Park, Design U.S. Appl. No. 29/449,523, filed Mar. 15, 2013.
Andrew Schuyler, Design U.S. Appl. No. 29/448,655, filed Mar. 13, 2013.
Andrew Schuyler, Design U.S. Appl. No. 29/448,653, filed Mar. 13, 2013.
Schonbek Product Collection, 26-pages, Jan. 2013.

* cited by examiner

ARRANGEMENTS OF DECORATIVE ELEMENTS, LIGHTING FIXTURES, AND METHODS FOR PROVIDING ILLUMINATION

CROSS-REFERENCE TO RELATED APPLICATIONS

This application is related to commonly assigned, co-pending patent application Ser. No. 29/449,521, concurrently filed herewith, by Saewoo Park, and entitled "Light Fixture Trim", and commonly assigned, co-pending patent application Ser. No. 29/449,523, concurrently filed herewith, by Saewoo Park, and entitled "Light Fixture Arm", which applications are hereby incorporated in their entirety herein by reference.

FIELD OF THE INVENTION

This present disclosure relates generally to arrangements of decorative elements, lighting fixtures, and methods for providing illumination.

BACKGROUND OF THE INVENTION

Pendant lights are lighting devices that hang from a ceiling. Typically, a pendant light is supported from a ceiling mount by a cord, chain, or pipe, an upper end of which is attached to the ceiling mount, and a lower end of which is attached to the lighting device. Often the lighting device includes shade and a light such as a light bulb. The shade is often in the form of a bulbous glass shade, a cylindrical drum shade, or a conical shade.

Chandeliers are branched, decorative ceiling-mounted light fixtures. Typically, chandeliers are ornate, and include a number of lamps and complex arrays of glass or crystal prisms to illuminate a room with refracted light.

There is a need for further arrangement of decorative elements, lighting fixtures, and methods for providing illumination.

SUMMARY OF THE INVENTION

In a first aspect, the present disclosure provides an arrangement of decorative elements. The arrangement includes a frame, a plurality of strands of ornaments supported from the frame, a plurality of slats supported from the frame, and wherein the plurality of slats is interspersed with the plurality of strands of ornaments to define a row of strands of ornaments and slats supported from the frame.

In a second aspect, the present disclosure provides a lighting fixture which includes the arrangement of decorative elements as noted above, and at least one of a lighting device and a receptacle for receiving a lighting device disposed adjacent to the row of strands of ornaments and slats.

In a third aspect, the present disclosure provides a frame for supporting an arrangement of decorative elements. The frame includes an inner support operably connectable to the arrangement of decorative elements, an outer support, and a bracket for supporting the outer support around an outer peripheral edge of the inner support.

In a fourth aspect, the present disclosure provides a lighting fixture having the frame as noted above comprising the inner support and the outer support, a plurality of decorative elements suspended from the inner support, and at least one of a lighting device and a receptacle for receiving a lighting device disposed adjacent to decorative elements.

In a fifth aspect, the present disclosure provides a method for providing illumination. The method includes providing a plurality of slats interspersed with the plurality of strands of ornaments to define a row of strands and slats, and emitting light onto one side of the row of strands and slats.

BRIEF DESCRIPTION OF THE DRAWINGS

The subject matter which is regarded as the disclosure is particularly pointed out and distinctly claimed in the concluding portion of the specification. The disclosure, however, may best be understood by reference to the following detailed description of various embodiments and the accompanying drawings in which:

DETAILED DESCRIPTION OF THE INVENTION

Figure 1:
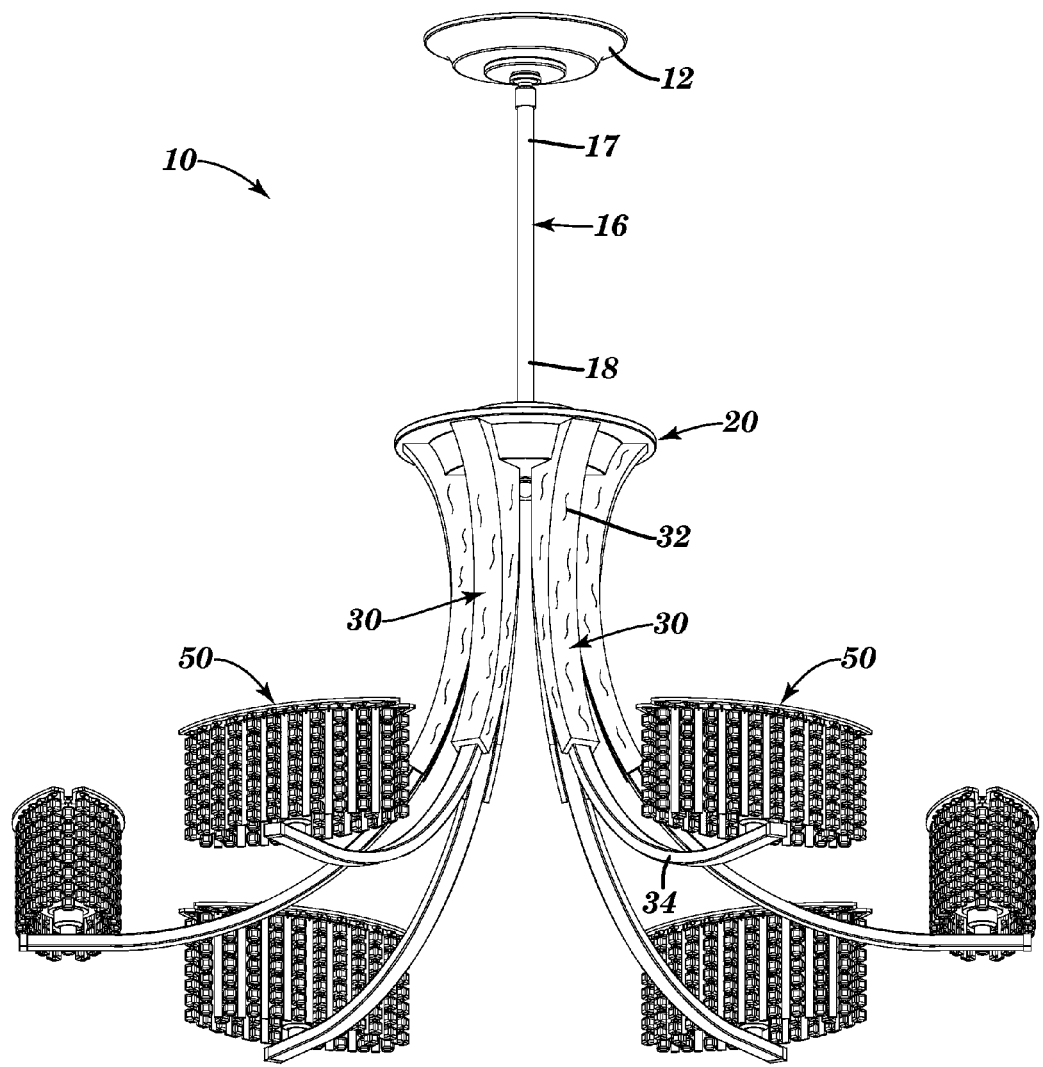
FIG. 1 is a perspective view of one embodiment of a lighting fixture in accordance with aspects of the present disclosure.

FIG. 1 illustrates one embodiment of a lighting fixture 10 in accordance with aspects of the present disclosure. For example, lighting fixture 10 may be suspended and supported below a ceiling. In this illustrated embodiment, lighting fixture 10 generally comprises a ceiling mount 12, an elongated member 16, arm support 20, a plurality of arms 30, and a plurality of arrangements of decorative elements, which as shown in FIG. 1, may define a plurality of shades 50. An upper end portion 17 of elongated member 16 is operably attachable to ceiling mount 12 and a lower end portion 18 of elongated member 16 is operably attachable to arm support 20.

Upper end portions 32 of arms 30 are operably attachable to arm support 20. For example, the upper end portions of the arms may be attached to the arm support so that the arms are spaced apart and extend radially outwardly from the arm support. Lower end portions 34 of each of arms 30 may be operably attached to respective ones of shades 50. Lower end portions 34 of arms 30 may operably attached to and support a light source such as a light bulb or other illuminable device, or receptacle for receiving a light source such as a light bulb or other illuminable device disposed in shade 50. The lighting fixture may be operably connected to an electrical supply, for example, via an electrical cable running through the elongated member and into each of the arms. For example, the elongated member and the arms may be hollow. Alternatively, the lighting fixture may be suspended from an electrical cable or from one or more support wires.

Figure 2:
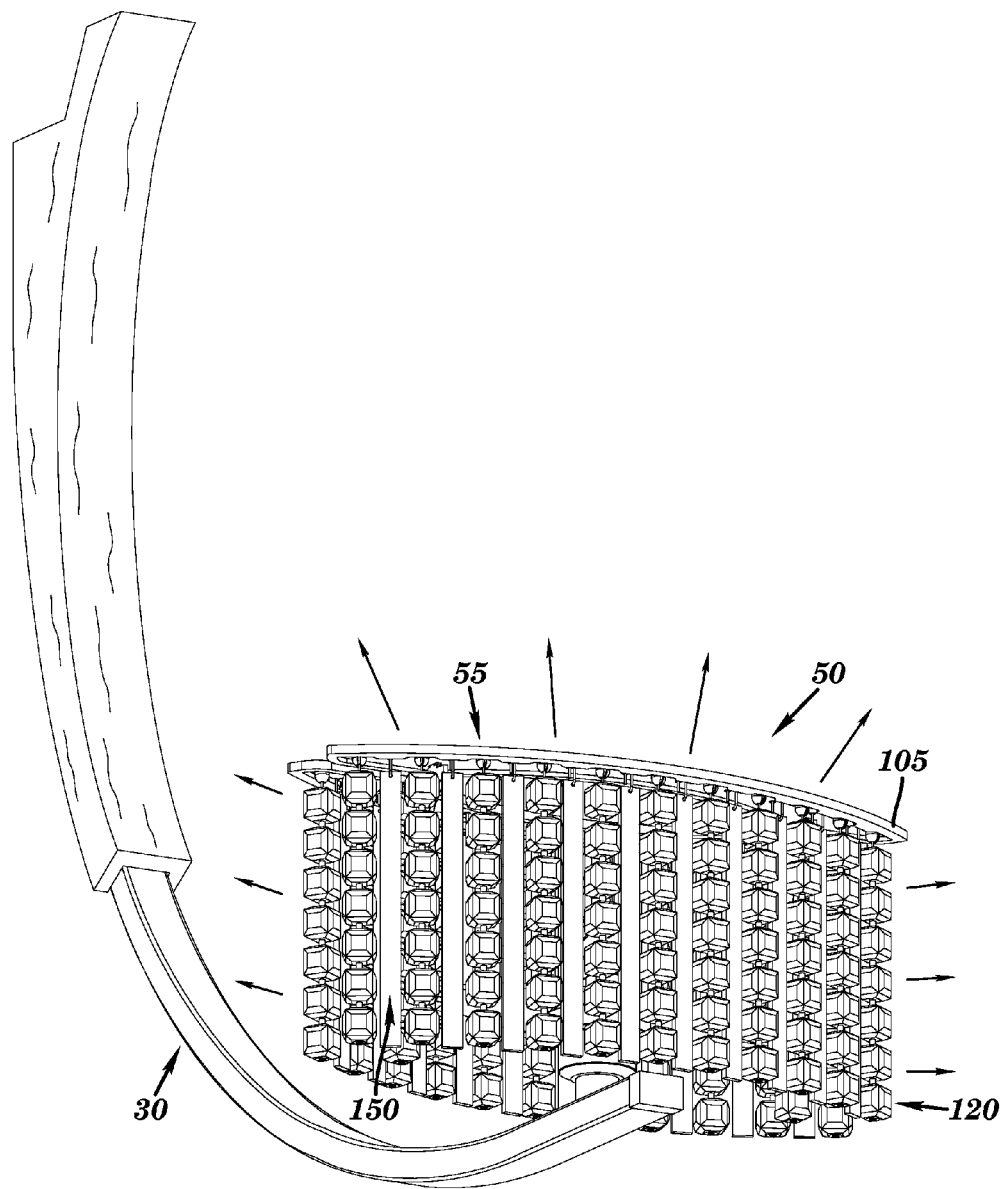
FIG. 2 is an enlarged perspective view of one of the lighting fixture arms and arrangement of decorative elements of FIG. 1.

With reference to FIG. 2, shade 50 may include a frame 55 operable for supporting or hanging a plurality of strands of ornaments 120, and a plurality of slats 150. The plurality of strands of ornaments may be interspersed with the plurality of slats to define a row of strands of ornaments and slats. The row of strands of ornaments and slats may extend around at least a portion of a light source such as a light bulb or other illuminable device. In one embodiment, the upper portion of the arm may be formed from wood, and arm support 20 (FIG. 1) and a lower portion of the arm may be formed from a metal or have reflective or mirrored surface.

Figure 3:
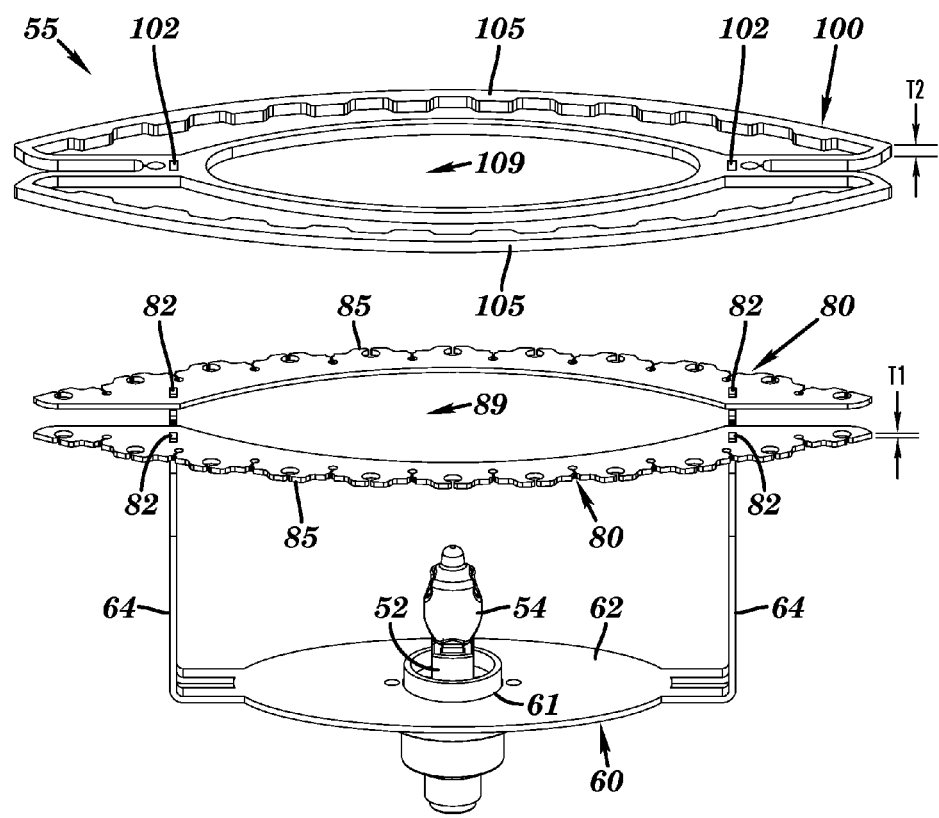
FIG. 3 is an enlarged exploded perspective view of a frame for supporting the arrangement of decorative elements of FIG. 2.
Figure 4:
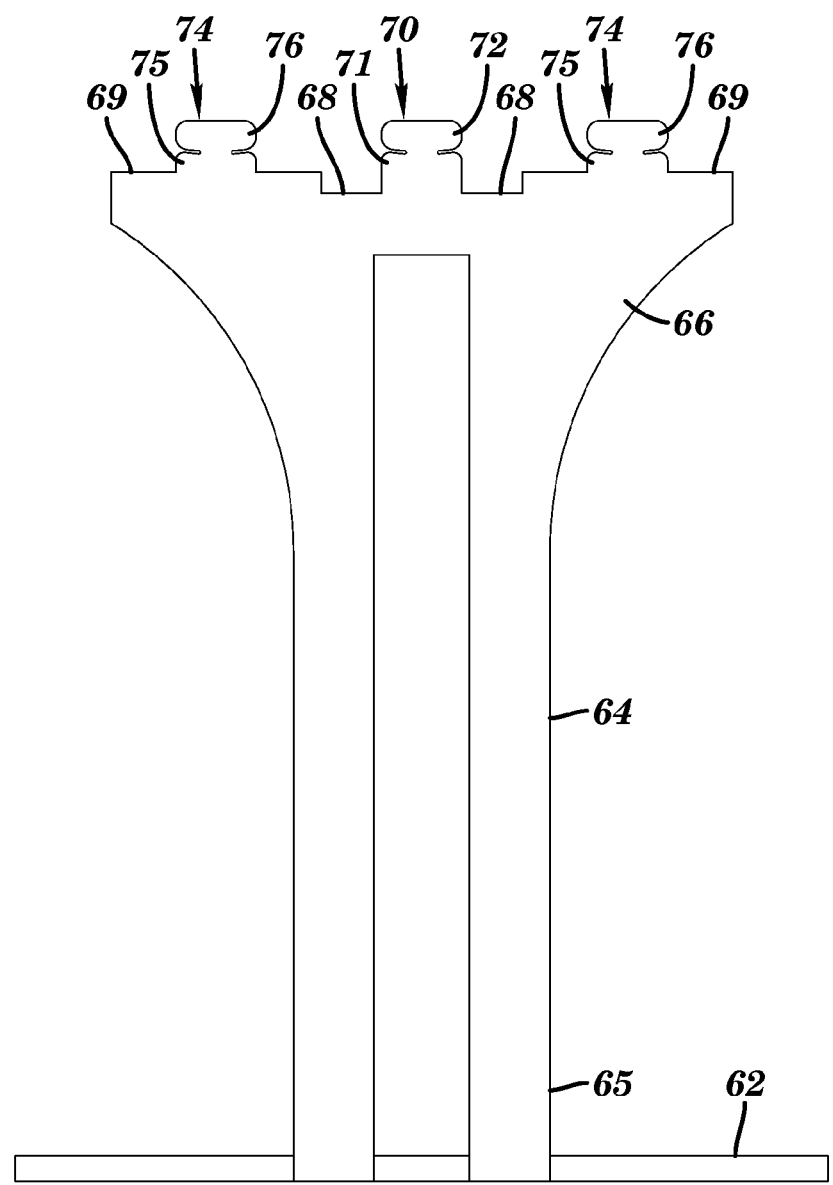
FIG. 4 is an enlarged side elevational view of the bracket of FIG. 3.

As shown in FIG. 3, frame 55 may include a bracket 60, inner supports 80, and an outer support 100. Bracket 60 may include a base 62 and side portions 64. Base 62 may include an aperture 61 for receiving and being operable attachable to a receptacle 52 which receptacle is operable attachable to a bulb 54 or other lighting device. For example, as best shown in FIG. 4, side portions 64 may include a lower portion 65 that attaches to base 62, and an upper portion 66. Upper portion 66 may operably attached to inner supports 80 (FIG. 3), and outer support 100 (FIG. 3).

With reference still to FIG. 4, upper portion 66 of side portion 64 may comprise an edge defining a plurality of rest or stops and posts for supporting inner supports 80 (FIG. 3) and outer support 100 (FIG. 3). For example, upper portion 66 may define an edge or stops 68 and post 70 for supporting outer support 100, and upper portion 66 may define edges or stops 69 and posts 74 for supporting inner supports 80. Post 70 may include a lower portion 71 and an upper twistable portion 72. Posts 74 may include a lower portion 75 and an upper twistable portion 76. Stop 68 may be disposed lower than stops 69.

With reference again to FIG. 3, inner supports 80 may have a thickness T1, and outer support 100 may have a thickness T2. Thickness T2 may be greater than thickness T1. Outer support 100 may include first and second apertures 102, in each of which is receivable over one of posts 70 (FIG. 4) of bracket 60 (FIG. 4). Inner supports 80 may include first and second apertures 82, each of which receive one of posts 74 (FIG. 4) of bracket 60 (FIG. 4).

The configuration and positioning of the inner and outer supports relative to each other and the positioning of the stops on the bracket allows a peripheral edge 85 of inner supports 80 to be generally obscured by a peripheral edge 105 of outer support 100. Peripheral edges 85 of inner supports 80 may be obscured from view by an observer by peripheral edge 105 when viewing shade 50 from below. For example, as shown in FIG. 2, whereas inner support has a non-uniform outer peripheral edge, frame 50 may be observed from below as having a smooth outer peripheral edge 105.

Figure 5:
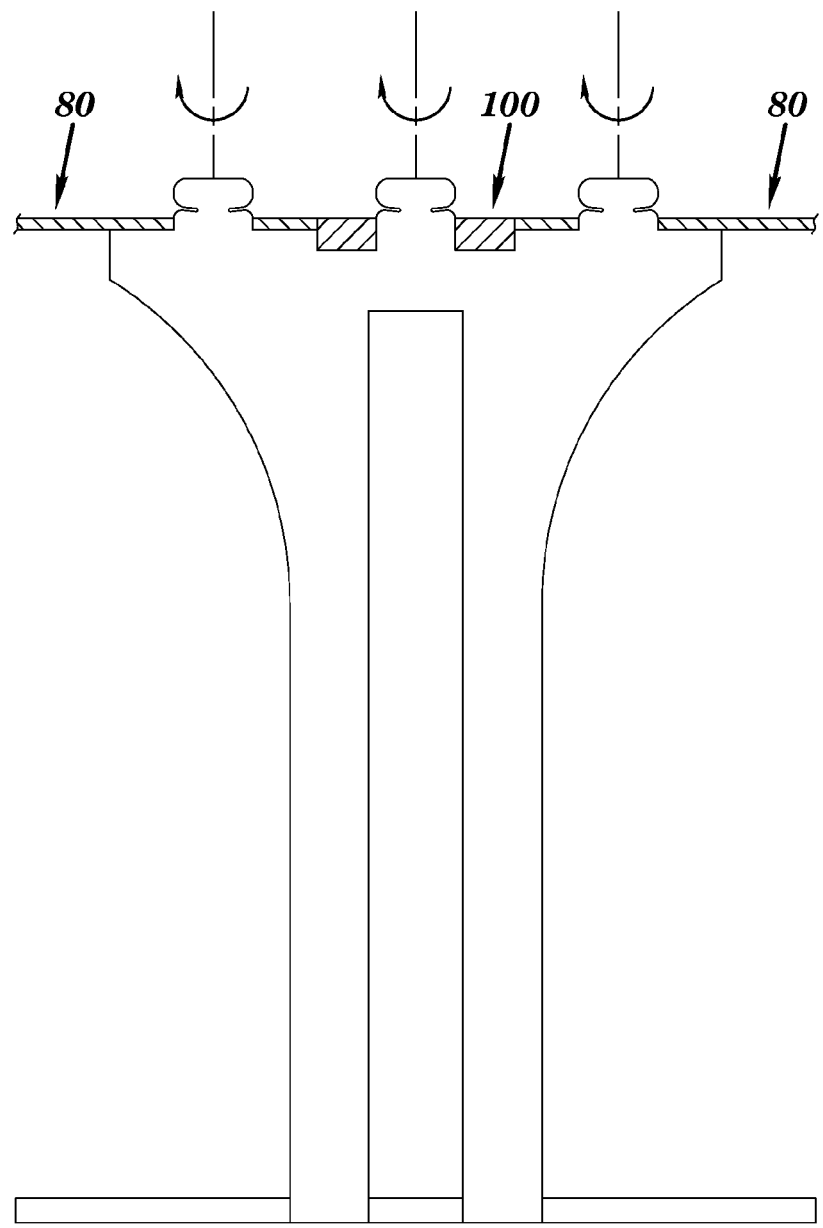
FIG. 5 is a side elevational view of the frame, in part cross-section, of FIG. 3.

With reference again to FIG. 3, the inner and outer supports may be planar, and when inner supports 80 and outer support 100 are connected to bracket 60, inner supports 80 may be nested inside outer support 100. As shown in FIG. 5, upper and lower surfaces of inner support 80 may be even with or disposed between upper and lower surfaces of outer support 100. Inner supports 80 and outer support 100 may be securely attached to side portions 64 by twisting twistable portions 71 and 73.

With reference again to FIG. 3, base 62 may be opaque or have an opaque or mirrored surface and extend between the plurality of strands of ornaments and plurality of slats generally across the bottom of the shade so as to inhibit emission of light downwardly directly from the light source. In other embodiments of the shade, the inner and outer support may be supported from above by an arm of the light fixture.

Figure 6:
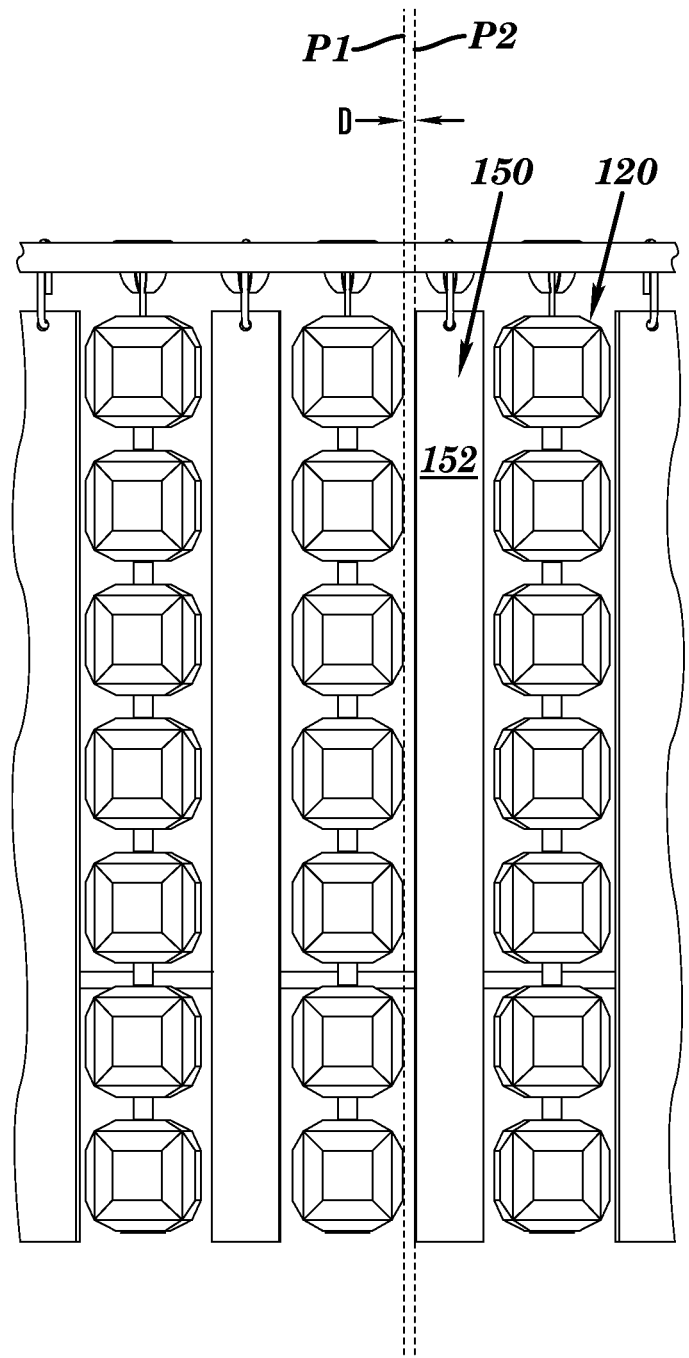
FIG. 6 is an enlarged view of a portion of the arrangement of decorative elements of FIG. 1.

As shown in FIG. 6, strands of ornaments 120 and slats 150 may comprise alternating strands of ornaments and slats. In one embodiment, the plurality of strands of ornaments may comprise a plurality of elongated strands of translucent crystal ornaments. The plurality of slats may comprise a plurality of elongated slats. The slats may be opaque and/or have at least an outer mirrored surface 152. The ornaments may be of any available size. In one example, the crystal ornaments may be generally cube-shaped faceted crystals having a height of about ⅜ inch, a width of about ⅜ inch, and a depth of about ⅜ inch. The slats may have a length of about 3¼ inch, a width of about ¼ inch, and a depth of about 1/16 inch. In this illustrated embodiment, light may be emitted from shade 50 upwardly through opening 109 in outer support 100, and opening 89 disposed between inner supports 80, as well as through the crystal ornaments. The width of overall shade may be about 3⅜ inches and length of overall shade may be about 7¾ inches. It will be appreciated that the dimensions of the shade, elements, ornaments, and slats may be any suitable size. In addition, the lighting fixture may be configured as a pendent having a single row of decorative elements surrounding one or more light sources. The row may be a generally circular row, a generally oval row, a row disposed in a generally square configuration, a row disposed in a generally rectangular configuration, or a row formed in any suitable configurations, and combinations thereof.

With reference still to FIG. 6, the arrangement of decorative elements may be arranged so that edge portions of some of the plurality of strands 120 of ornaments define a first profile P1, and edge portions of some of the plurality of slats 150 define a second profile P2. A horizontal distance D between the first profile and the second profile may be generally constant along a length of at least one of the strand of ornaments and the slats. In additional, the spacing between the strands of ornaments and slats may be generally constant between each of the strands of ornaments and slats. The arrangement of decorative elements may have other edge profiles. For example, the ornaments may have different sizes defining a profile along the length of the strand of ornaments and the slats may have different widths along its length to define a generally matingly corresponding constant spaced-apart profile. For example, the profiles of the strands of ornaments and the slats may be curved. In addition, the profiles may be matching or corresponding and non-matching or corresponding profiles.

Figure 7:
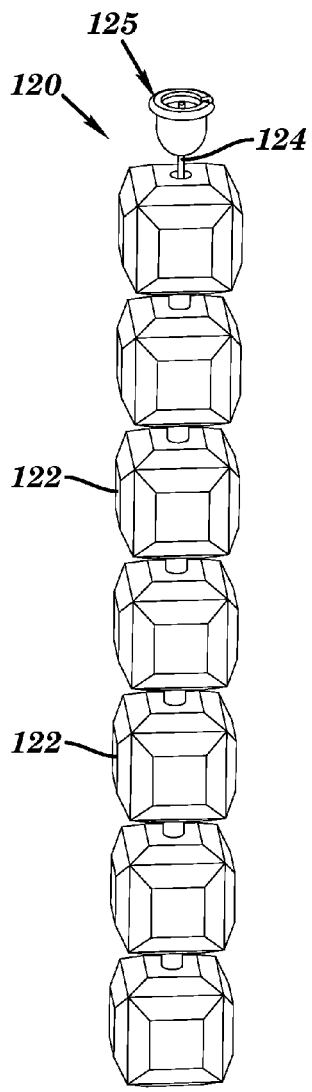
FIG. 7 is an enlarged perspective view of one of the plurality of stands of ornaments of the arrangement of decorative elements of FIG. 1.
Figure 8:
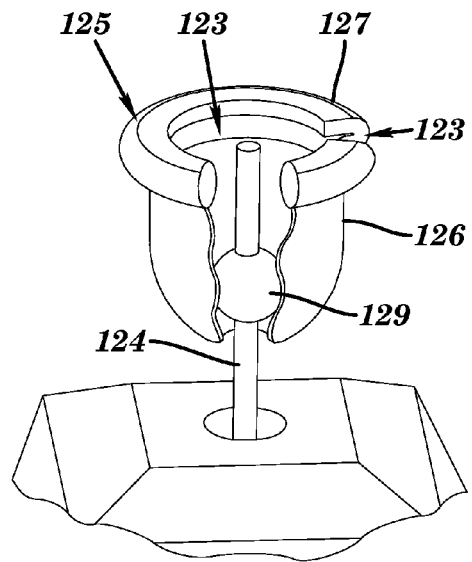
FIG. 8 is an enlarged perspective view of an upper end portion of the strand of ornaments of FIG. 7.

With reference to FIG. 7, strands of ornaments 120 may include a plurality of ornaments 122 supported and/or connected by a string or wire 124. The upper end of the string ort wire is attached to a connector 125. As shown in FIG. 8, connector 125 may include a body portion 126 and an outwardly extending ridge 127. Connector 125 may define a cavity 123 therein. Along the length of the side of connector 125 may be a cutout 123 allowing the upper portion of the wire 124 to pass therethrough and allow a ball or clamp 129 to rest on the bottom of connector 125.

Figures 9, 10:
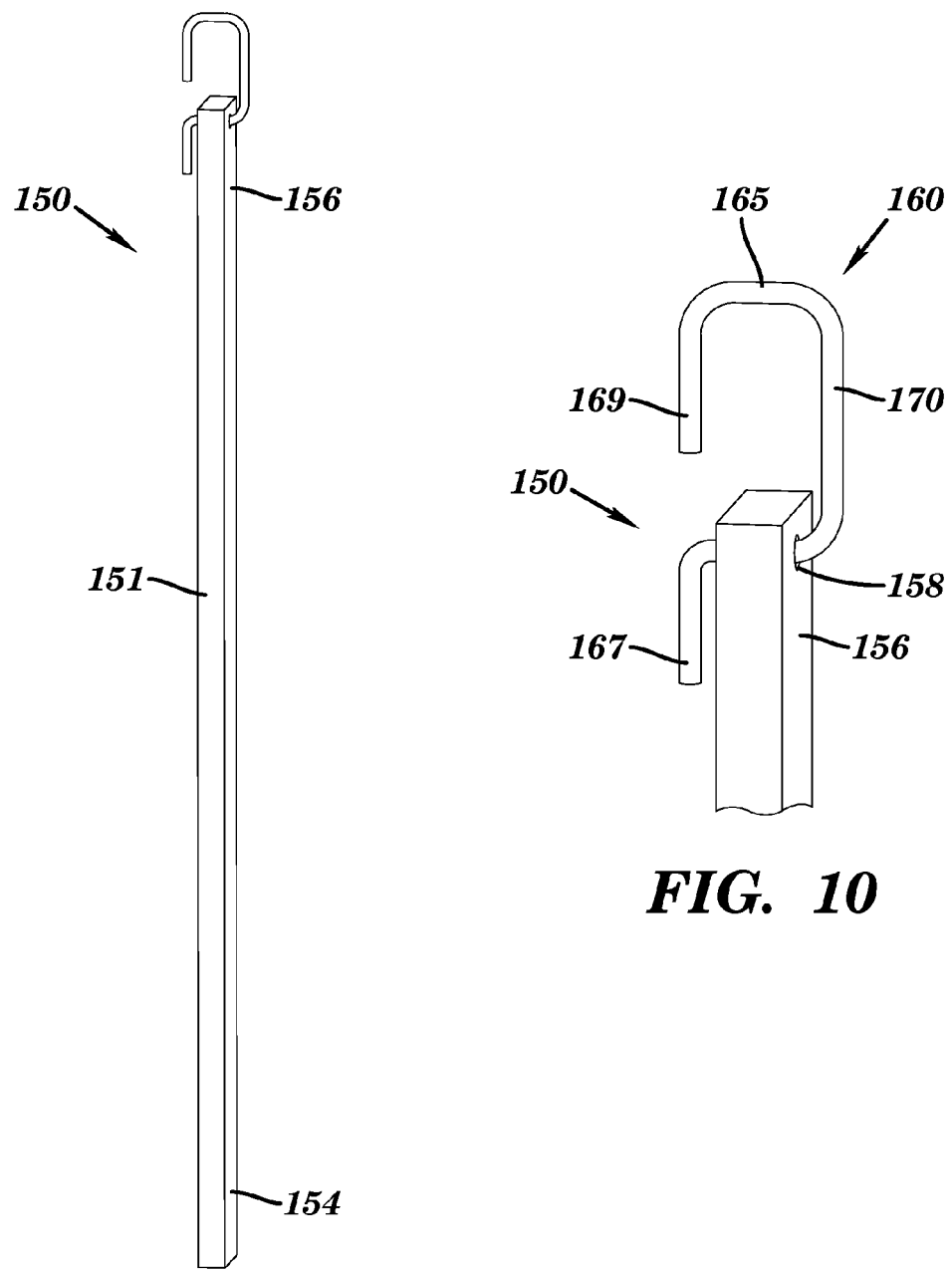
FIG. 9 is an enlarged perspective view of one of the plurality of slats of the arrangement of decorative elements of FIG. 1.
FIG. 10 is an enlarged perspective view of the top end portion of the slat of FIG. 9.

With reference to FIG. 9, slat 150 may include an elongated member 151 having a lower end 154 and an upper end 156. As best shown in FIG. 10, upper end 156 of slat 150 may include an aperture 158 for receiving a wire hook or clip 160 having an upper inverted U-shaped portion 165 and an S-shaped lower portion 167.

Figure 11:
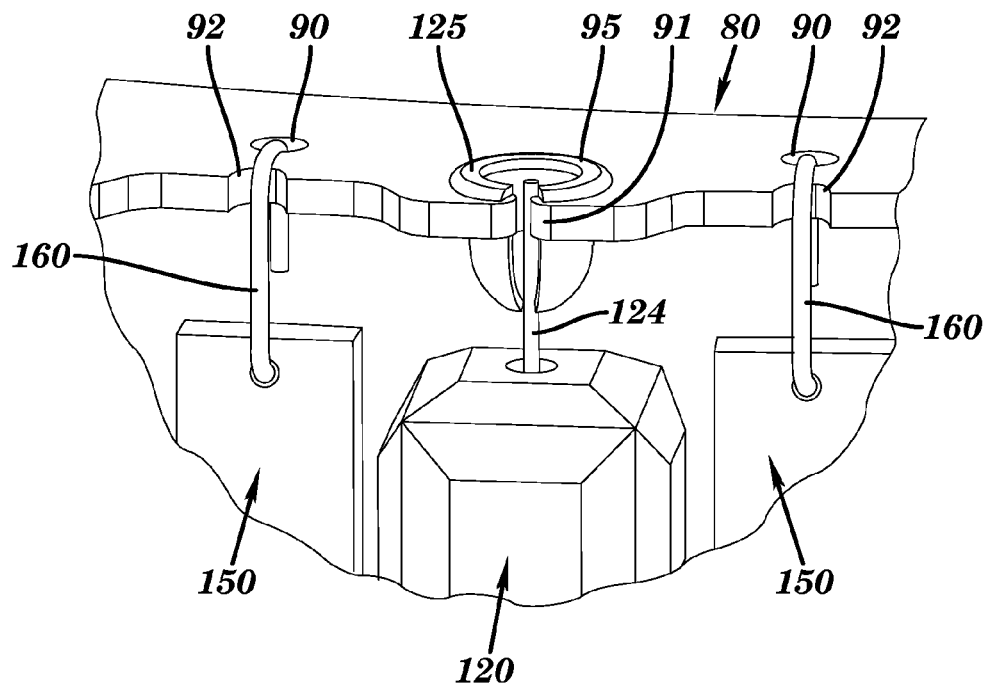
FIG. 11 is an enlarged partial perspective view of the inner support of FIG. 3 supporting upper ends of the strands of ornaments and slats.
Figure 12:
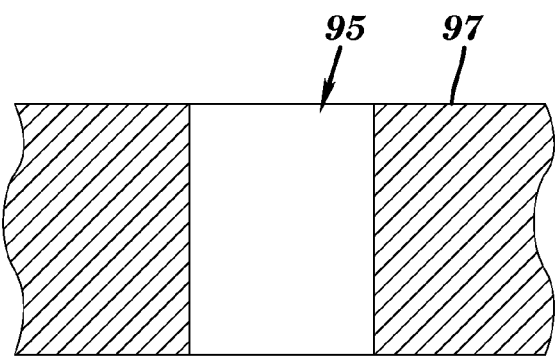
FIG. 12 is a cross-section of a portion of inner support of FIG. 11 illustrating an aperture for supporting a strand of ornaments.

As shown in FIG. 11, inner support 80 may include a plurality of apertures 90 for receiving a leg 169 (FIG. 10) of the upper inverted U-shaped portion of clip 160 of slat 150. A leg 170 (FIG. 10) may be disposed in a cutout 92 disposed along the peripheral edge of inner support 80. Inner support 80 may also include a plurality of apertures 95 for receiving and supporting connector 125 of strand 120. As shown in FIG. 12, aperture 95 may define a passageway sized to receive body 126 (FIG. 8) of connector 125 (FIG. 8) with the upper surface 97 of inner support 80 supporting a bottom surface of ridge 127 (FIG. 8) of connector 125 (FIG. 8). The outer peripheral edge of support 80 may have a gap or passageway 91 extending through the thickness to aperture 95 so that wire 124 may pass through gap 91 to position connector 125 in aperture 95. It will be appreciated that the inner support may have a recess or cutout around aperture 95 to that the ridge of the connector may be at least partially recessed in the inner support.

Figure 13:
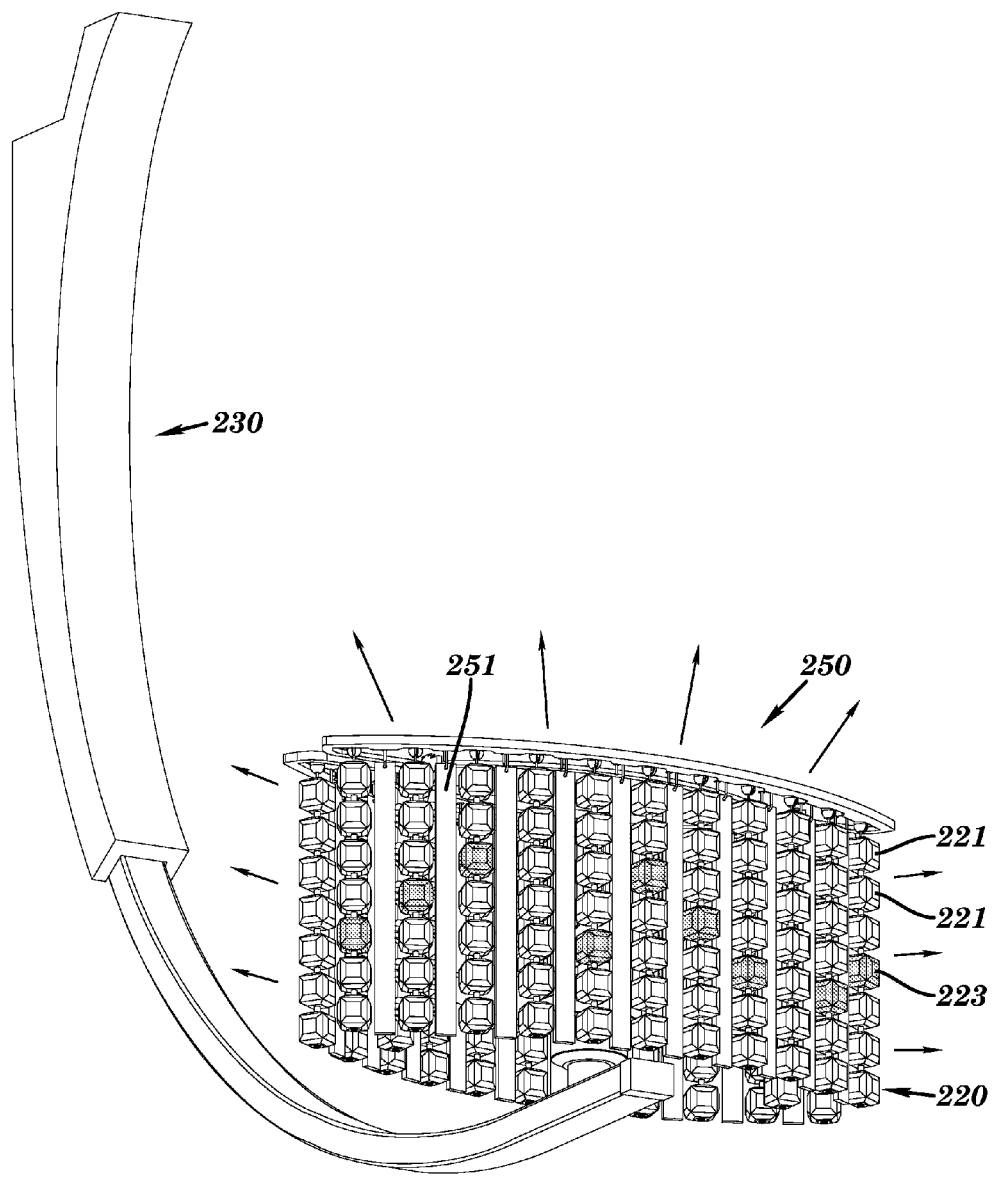
FIG. 13 is a perspective view of another embodiment of a lighting fixture arm and shade in accordance with aspects of the present disclosure.

FIG. 13 is a perspective view of another embodiment of a lighting fixture arm 230 and shade 250 in accordance with aspects of the present disclosure. In this illustrated embodiment, an arrangement of decorative elements such as a shade 250 may comprise a plurality of strands of ornaments 220 and a plurality of slats 250. The plurality of strands may include first ornaments 221 and second ornaments 223 which are different from first ornaments 221 to define a pattern of different ornaments. For example, the first ornaments may include clear transparent ornaments such as clear transparent crystals, and the second ornaments may include transparent colored crystals or opaque ornaments. The slats may be opaque slats or slats having a mirrored outer surface and/or an inner mirrored surface.

Figure 14:
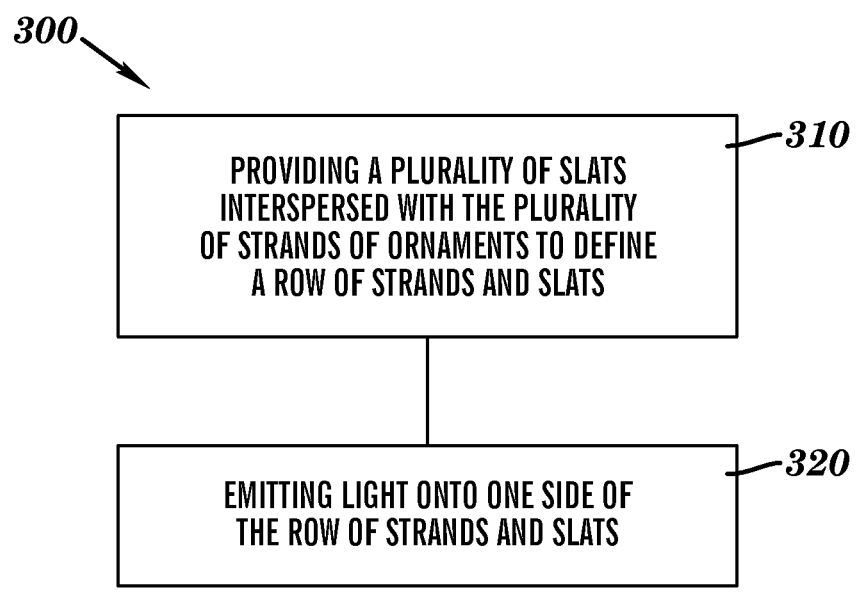
FIG. 14 is a flowchart illustrating a method for providing illumination in accordance with aspects of the present disclosure.

FIG. 14 illustrates one embodiment of a method 300 for providing illumination in accordance with aspects of the present disclosure. The method generally includes, at 310, providing a plurality of slats interspersed with the plurality of strands of ornaments to define a row of strands and slats, and a 320, emitting light onto one side of the row of strands and slats. For example, the ornaments may be translucent crystal ornaments, the slats may be opaque and/or have an outer reflective or mirrored surface. The row of strands and slats extends generally around the emitted light. The row may comprise alternating strands of ornaments and slats.

In the above embodiments of the lighting fixture, light may be emitted outwardly from the arrangement of decorative elements and upwardly between the arrangement of decorative elements as shown by the arrows in FIG. 2. In addition, light may be blocked from emission downwardly between the arrangement of the decorative elements by the base of the bracket. The elements, ornaments, or slats may refract, emit, and/or reflect light. The elements, ornaments, or slats may comprise a plastic, stone, metal, or glass material. The opaque, translucent, or transparent elements, ornaments, or slats may comprise a tint or color, for example, blue or red, but may typically be substantially clear. The elements, ornaments, or slats may be solid, hollow, or have passageways therethrough, and combinations thereof. The elements, ornaments, or slats may be of any suitable size. The elements, ornaments, or slats may be a monolithic structure or comprise a one-piece construction, or formed from several separate pieces. The elements, ornaments, or slats may be double-pointed, tetrahedrons, polyhedrons, or have other faceted configurations. The elements, ornaments, or slats may be observable to observers when the lighting fixture is viewed from below or from below and to the side. The light source may be or may not be observable to observers when the lighting fixture is viewed from below or from below and to the side.

The light source may be an LED or light emitting diode light source, incandescent, florescent, or other suitable light sources, and combinations thereof.

It is to be understood that the above description is intended to be illustrative, and not restrictive. For example, the above-described embodiments and/or aspects thereof may be used in combination with each other. In addition, many modifications may be made to adapt a particular situation or material to the teachings of the various embodiments without departing from their scope.

While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A lighting fixture comprising:
a plurality of arrangements of decorative elements, each of said plurality of arrangements of decorative elements comprising:
a frame comprising an inner support and an outer support extending around an outer peripheral edge of said inner support;
a plurality of strands of ornaments supported from said inner support of said frame;
a plurality of slats supported from said inner support of said frame;
wherein said plurality of slats is interspersed with said plurality of strands of ornaments to define a row of strands of ornaments and slats supported from said inner support of said frame; and
wherein an upper and a lower surfaces of said inner support is disposed generally even with an upper and a lower surfaces of said outer support; and
a plurality of at least one of lighting devices and receptacles for receiving lighting devices each of which is disposed adjacent to a different one of said row of strands of ornaments and slats of said plurality of arrangements of decorative elements.

2. The lighting fixture of claim 1 wherein said frame comprises a bracket for supporting said inner support and said outer support.

3. The arrangement of claim 2 wherein said bracket is operable for supporting a receptacle for receiving a lighting device.

4. The arrangement of claim 2 wherein said bracket comprises a plurality of posts operably insertable in openings in said inner support and said outer support.

5. The arrangement of claim 4 wherein said plurality of posts comprises a twistable portion for releasably attaching said inner support and said outer support to said bracket.

6. The lighting fixture of claim 1 wherein said plurality of slats being intersperse between said plurality of strands of ornaments comprises alternating strands of ornaments and slats defining said row of strands of ornaments and slats.

7. The lighting fixture of claim 1 wherein said plurality of ornaments and said plurality of slats comprises generally the same vertical length.

8. The lighting fixture of claim 1 wherein said plurality of strands of ornaments comprises a plurality of strands of crystal ornaments.

9. The lighting fixture of claim 1 wherein said plurality of slats comprises a plurality of slats having an outer mirrored surface.

10. The lighting fixture of claim 1 wherein said plurality of strands of ornaments comprises a plurality of strands of crystal ornaments, and said plurality of slats comprises a plurality of slats having an outer mirrored surface.

11. The lighting fixture of claim 1 wherein edge portions of some of said plurality of strands of ornaments define a first profile, edge portions of some of said plurality of slats define a second profile, and when a first of said strand of ornaments is disposed adjacent to a first of said slats, a horizontal distance between said first profile to said second profile is generally constant along a vertical length of at least one of said ornaments and said slats.

12. The lighting fixture of claim 11 wherein said first profile and said second profile define straight lines.

13. The lighting fixture of claim 11 wherein said first profile and said second profile define vertical straight lines.

14. The lighting fixture of claim 1 wherein said frame comprises a bracket for supporting said inner support and said outer support, and said bracket is operable for supporting a receptacle for receiving a lighting device.

15. The lighting fixture of claim 1 wherein said row of strands of ornaments and slats comprises a curved row of strands of ornaments and slats.

16. The lighting fixture of claim 1 wherein each of said plurality of said arrangements extends generally around a different one of said plurality of said at least one of lighting devices and said receptacles for lighting devices.

17. The lighting fixture of claim 1 wherein said inner support comprise a plurality of apertures operably attachable to at least one of upper ends of said plurality of strands of ornaments and upper ends of said plurality of slats.

18. The lighting fixture of claim 1 wherein said outer support comprises a smooth outer peripheral edge.

19. An arrangement of decorative elements, said arrangement comprising:
a frame comprising an inner support and an outer support extending around an outer peripheral edge of said inner support;
a plurality of strands of ornaments supported from said inner support of said frame;
a plurality of slats supported from said inner support of said frame;
wherein said plurality of slats is interspersed with said plurality of strands of ornaments to define a row of strands of ornaments and slats supported from said frame; and
wherein said inner support comprises a plurality of inner supports, and said outer support comprises a plurality of openings each of which for receiving a different one of said plurality of inner supports.

20. A lighting fixture comprising:
said arrangement of claim 19; and
at least one of a lighting device and a receptacle for receiving a lighting device disposed adjacent to said row of strands of ornaments and slats.

21. An arrangement of decorative elements, said arrangement comprising:
a frame comprising an inner support comprising a generally planar support, and an outer support comprising a generally planar support extending around an outer peripheral edge of said inner support;
a plurality of strands of ornaments supported from said inner support of said frame;
a plurality of slats supported from said inner support of said frame;
wherein said plurality of slats is interspersed with said plurality of strands of ornaments to define a row of strands of ornaments and slats supported from said frame; and
wherein said inner support comprise a first thickness, and said outer support comprise a second thickness greater than said first thickness.

22. A lighting fixture comprising:
said arrangement of claim 21; and
at least one of a lighting device and a receptacle for receiving a lighting device disposed adjacent to said row of strands of ornaments and slats.

23. The arrangement of claim 21 wherein said frame comprises a bracket operable for supporting upper and lower surfaces of said inner support disposed between a lower surface of said outer support and an upper surface of said outer support.

24. The arrangement of claim 23 wherein said bracket comprises a plurality of posts for operably insertable in openings in said inner support and said outer support.

25. The arrangement of claim 24 wherein said plurality of posts comprises a twistable portion for releasably attaching said inner support and said outer support to said bracket.

26. A method for providing illumination, the method comprising:
   providing a plurality of slats interspersed with a plurality of strands of ornaments to define a row of strands and slats;
   emitting light from a light source onto one side of the row of strands and slats and outwardly from the row of strands and slats;
   inhibiting the light source from being observable to an observer when the row of strands and slats is viewed generally from below and from below and to the side; and
   wherein the inhibiting comprises providing an opaque member disposed below the light source and adjacent the row of strands and slats.

27. The method of claim 26 wherein the row of strands of ornaments and slats extends generally around the emitted light.

28. The method of claim 26 wherein the plurality of strands of ornaments comprises a plurality of translucent crystal ornaments.

29. The method of claim 26 wherein plurality of slats comprises at least an outer mirrored surface.

30. The method of claim 26 wherein the inhibiting comprises providing the row of strands and slats adjacent to at least a portion of the light source.

31. The method of claim 26 wherein the providing the plurality of slats interspersed with the plurality of strands of ornaments comprises defining a first row of strands and slats, a second row of strands and slats, and wherein the first and second rows comprise define an elongated configuration.

32. The method of claim 31 wherein the first row is curved and the second row is curved and ends of the first row being spaced adjacent to ends of the second row.

* * * * *